US012239944B2

(12) United States Patent
Hirschmann et al.

(10) Patent No.: US 12,239,944 B2
(45) Date of Patent: Mar. 4, 2025

(54) SYSTEMS AND METHODS RELATED TO FLUID PUMPING

(71) Applicant: PLAS-TECH ENGINEERING, INC., Lake Geneva, WI (US)

(72) Inventors: Aaron Hirschmann, Lake Geneva, WI (US); Robert Fesus, Lake Geneva, WI (US)

( * ) Notice: Subject to any disclaimer, the term of this patent is extended or adjusted under 35 U.S.C. 154(b) by 0 days.

(21) Appl. No.: 18/366,941

(22) Filed: Aug. 8, 2023

(65) Prior Publication Data

US 2024/0109044 A1 Apr. 4, 2024

Related U.S. Application Data

(62) Division of application No. 16/028,520, filed on Jul. 6, 2018, now Pat. No. 11,717,797.

(Continued)

(51) Int. Cl.

| | |
|---|---|
| ***B01F 31/00*** | (2022.01) |
| ***A61J 1/20*** | (2006.01) |
| ***B01F 23/50*** | (2022.01) |
| ***B01F 23/53*** | (2022.01) |
| ***B01F 25/451*** | (2022.01) |
| ***B01F 25/452*** | (2022.01) |
| ***B01F 31/65*** | (2022.01) |
| ***B01F 35/512*** | (2022.01) |

(Continued)

(52) U.S. Cl.

CPC ............. *B01F 31/65* (2022.01); *A61J 1/2089* (2013.01); *B01F 23/50* (2022.01); *B01F 23/53* (2022.01); *B01F 25/4512* (2022.01); *B01F 25/4521* (2022.01); *B01F 35/512* (2022.01); *B01F 35/7161* (2022.01); *B01F 35/7163* (2022.01); *B01F 35/717613* (2022.01); *F04B 13/02* (2013.01); *B01F 23/565* (2022.01); *B01F 2101/22* (2022.01); *F05C 2225/04* (2013.01); *F05C 2253/12* (2013.01)

(58) Field of Classification Search

CPC ........................ B01F 35/717613; A61J 1/2089

See application file for complete search history.

(56) References Cited

U.S. PATENT DOCUMENTS 4,621,567 A * 11/1986 Williams ................ F04B 23/06 417/458
4,621,576 A 11/1986 Williams (Continued)

FOREIGN PATENT DOCUMENTS

EP 1338332 8/2003
EP 1647255 4/2006

(Continued)

OTHER PUBLICATIONS

European Search Report in connection with application No. EP 18182156.2, dated Jun. 25, 2019, 8 Pages.

(Continued)

*Primary Examiner* — Anshu Bhatia
(74) *Attorney, Agent, or Firm* — Smith Keane LLP

(57) ABSTRACT

Systems for a plastic pump/actuator capable of containing and pumping organic solvents and lubricants and having a more desirable lubricity within the system. The system has at least two cylinders, with plungers therein, oppositely disposed from each other and configured to operably connect to a pump.

9 Claims, 8 Drawing Sheets

Related U.S. Application Data

(60) Provisional application No. 62/529,350, filed on Jul. 6, 2017.

(51) Int. Cl.

| | |
|---|---|
| ***B01F 35/71*** | (2022.01) |
| ***F04B 13/02*** | (2006.01) |
| *B01F 101/22* | (2022.01) |

(56) References Cited

U.S. PATENT DOCUMENTS

| | | | | |
|---|---|---|---|---|
| 2009/0012497 | A1 | 1/2009 | Uber, III et al. | |
| 2009/0093792 | A1 | 4/2009 | Gross et al. | |
| 2011/0060361 | A1 | 3/2011 | Schweiss et al. | |
| 2011/0160700 | A1* | 6/2011 | Nakamura | A61J 3/00 604/82 |
| 2013/0308416 | A1 | 11/2013 | Phan et al. | |
| 2013/0312868 | A1 | 11/2013 | Erez et al. | |

FOREIGN PATENT DOCUMENTS

| | | |
|---|---|---|
| GB | 2530809 | 4/2016 |
| WO | 20170087798 | 5/2017 |

OTHER PUBLICATIONS

European Examination Report in connection with application No. EP 18182156.2, dated Aug. 6, 2020, 4 Pages.

USPTO, Office Action for related U.S. Appl. No. 16/028,520, filed Jul. 2, 2020 dated, 6 pages.

USPTO, Office Action for related U.S. Appl. No. 16/028,520, filed Feb. 1, 2021 dated, 7 pages.

USPTO, Office Action for related U.S. Appl. No. 16/028,520, filed Aug. 1, 2022 dated, 8 pages.

Australian Examination Report in connection with application No. 2018204933, dated Aug. 14, 2023, 6 Pages.

* cited by examiner

SYSTEMS AND METHODS RELATED TO FLUID PUMPING

RELATED APPLICATIONS

This application is a divisional application of U.S. patent application Ser. No. 16/028,520, filed 6 Jul. 2018, entitled "Systems and Methods Related to Fluid Pumping," which claimed the benefit of U.S. Provisional Patent Application Ser. No. 62/529,350, filed 6 Jul. 2017, and titled "Systems and Methods Related to Fluid Pumping," both of which are incorporated herein by reference in their entireties.

BACKGROUND

This invention relates generally to a plastic reciprocating actuator with closure container for use with pumps requiring low resistance during pumping, for example for use with fluid dispensing systems and actuators. Generally, dispensers and actuators used in the medical field are metal, glass, or plastic and employ standard lubricants such as liquid, gel, or spray deposition lubricants, and utilize a rigid or compression gasket. The chemistry of the standard lubricants attack non-metal pumps, actuators, and seals (e.g., non-olefin plastics, thermoset plastics, liquid silicone rubber, polyisoprene, and some glass). Therefore, in circumstances in which organic solvents or other chemicals are used, certain silicone-based lubricants are incompatible and will damage or destroy the actuator cylinder, the pump, and the seals.

Further, metal actuators and pumps are incapable of providing visibility within the equipment; glass equipment may delaminate after usage and silicone-based lubricants cannot be used under harsh environments. Previously, plastic has not been used due to higher-than-desired static and kinetic friction within the system. Therefore, the field of medical devices is in need of a plastic pumping/actuating system that can contain and pump organic solvents and lubricants and has a more desirable surface tension within the system.

SUMMARY OF THE INVENTION

The present invention relates to improved systems and methods for a plastic pumping/actuating system capable of containing and pumping organic solvents and lubricants and has a more desirable lubricity within the system.

One aspect of the present invention is directed to a reciprocating actuator assembly with a first cylinder, a first plunger with a piston, a second cylinder configured to be coupled to and in fluid communication with the first cylinder, a second plunger with a piston configured to translate within the second cylinder, and a fluoropolymer coating applied within the first cylinder, within the second cylinder, and to the piston of the first plunger and the piston of the second plunger. Either or both of the first and second cylinders may comprise cyclic olefin copolymer (COC) or cyclo-olefin polymer (COP).

The first cylinder may have approximately a 1 cc capacity or a 3 cc capacity and whereby the static friction between the first cylinder and the first piston is less than about 2.5 N. Alternatively, the first cylinder may have approximately a 3 cc capacity and whereby the static friction between the first cylinder and the first piston is less than about 4.0 N.

The actuator assembly may also be configured to be operatively coupled to a pump, and wherein the first plunger may have a first end and a second end, wherein the first end of the plunger is received within the first cylinder and the second end of the plunger is received within a pump cylinder.

The actuator assembly may also have a check valve coupled between the first cylinder and the second cylinder, and the check valve may be configured to be removably coupled to a third cylinder with a third plunger.

Another aspect of the invention is directed to a method comprising the steps of providing a first plunger with a piston in a first cylinder containing a first substance, providing a second plunger with a piston in a second cylinder containing a second substance, whereby the first cylinder is in fluid communication with the second cylinder, transferring the second substance from the second cylinder to the first cylinder through movement of the first plunger, whereby the second substance mixes with the first substance and forms a mixture, and transferring the mixture from the first cylinder to the second cylinder through movement of the second plunger; whereby the first cylinder, the first piston, the second cylinder, and the second piston have a fluoropolymer coating. Whereby, the first substance may be a dry medicine and the second substance may be a liquid, and the first and second cylinders may comprise cyclic olefin copolymer (COC) or cyclo-olefin polymer (COP).

The first cylinder may have a capacity of approximately 1 cc and whereby the static friction between the first cylinder and the first piston is less than about 2.5 N. Alternatively, the first cylinder may have a capacity of approximately 3 cc and whereby the static friction between the first cylinder and the first piston is less than about 4.0 N.

The first plunger may have a first end and a second end, and the first end of the plunger may be received within the first cylinder and the second end of the plunger may be received within a pump cylinder.

The method may further comprise the steps of providing a check valve, coupling the check valve between the first cylinder and the second cylinder, providing a third cylinder with a third plunger, and coupling the third cylinder to the check valve.

DETAILED DESCRIPTION

Figure 1:
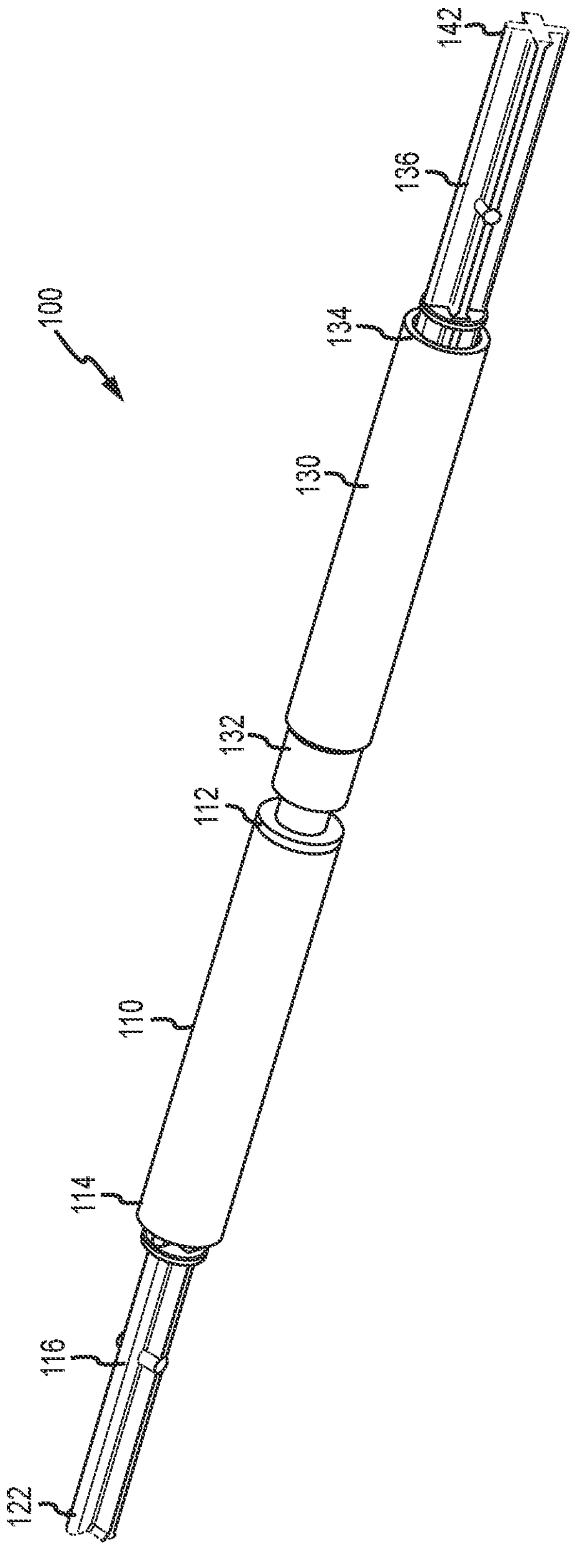
FIG. 1 is a perspective view of a first embodiment of a plastic actuator according to the present invention.

Although the disclosure hereof enables those skilled in the art to practice the invention, the embodiments described merely exemplify the invention which may be embodied in other ways. While the preferred embodiment has been described, the details may be changed without departing from the invention, which is defined by the claims. It should be noted that like part numbers represent like parts among the various embodiments.

FIGS. 1-4 provide various views of an exemplary first embodiment 100 of a reciprocating actuator assembly. According to the present invention, the reciprocating actuator assembly 100 preferably comprises a first cylinder 110; a first plunger 116; a second cylinder 130 opposite the first cylinder 110; and a second plunger 136.

Figure 9:
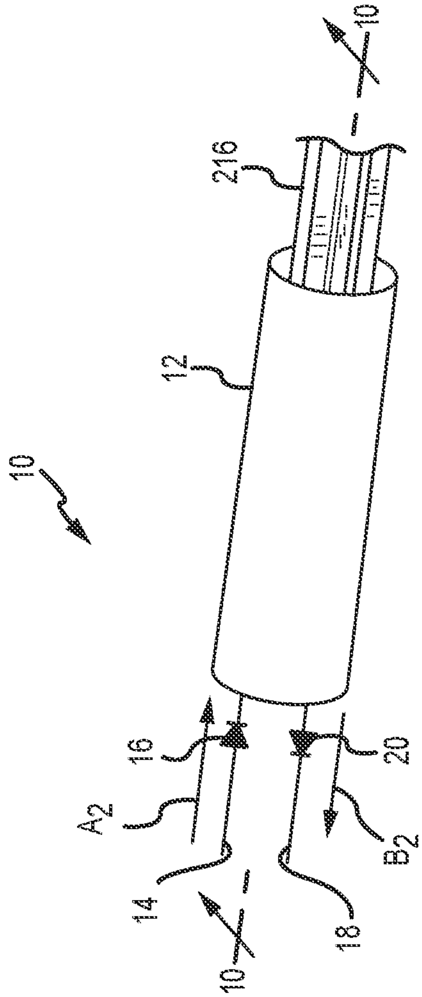
FIG. 9 is a first perspective view of a pump cartridge cylinder operable with an actuator according to the present invention.
Figure 10:
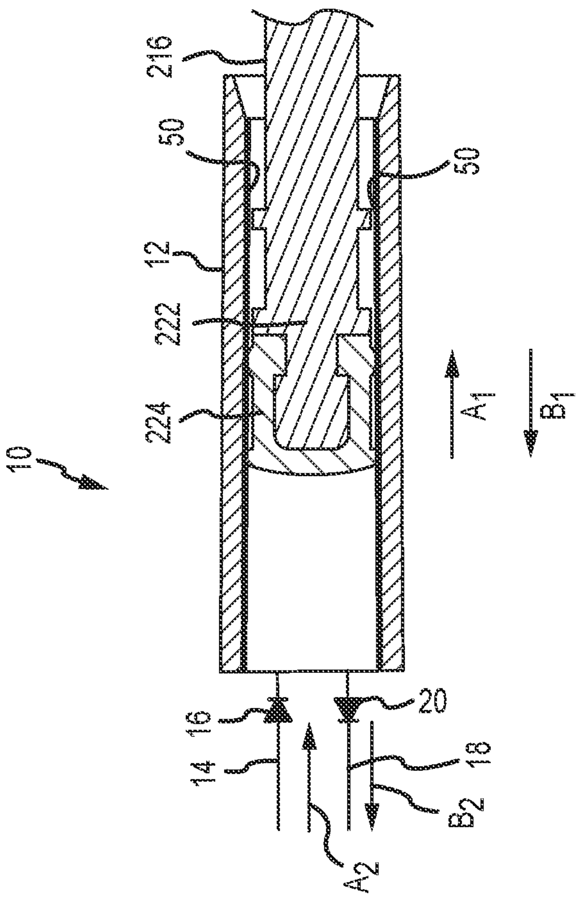
FIG. 10 is a cross-sectional view of the pump shown in FIG. 9 along line 10-10.

The reciprocating actuator system 100 is preferably configured to be operably connected to a pump 10 having a pump cylinder 12 (see FIGS. 9 and 10). The pump cylinder 12 is preferably configured to be receive the first or second plunger 116,136.

The first cylinder 110 preferably comprises a first end portion 112 and a second end portion 114. The first end portion 112 is preferably configured to removably attach to a first end portion 132 of the second cylinder 130; whereby the first and second cylinders 110,130 are configured to be in fluid communication with each other. The second end portion 114 is preferably configured to receive the first plunger 116 therein and therethrough.

Figure 2:
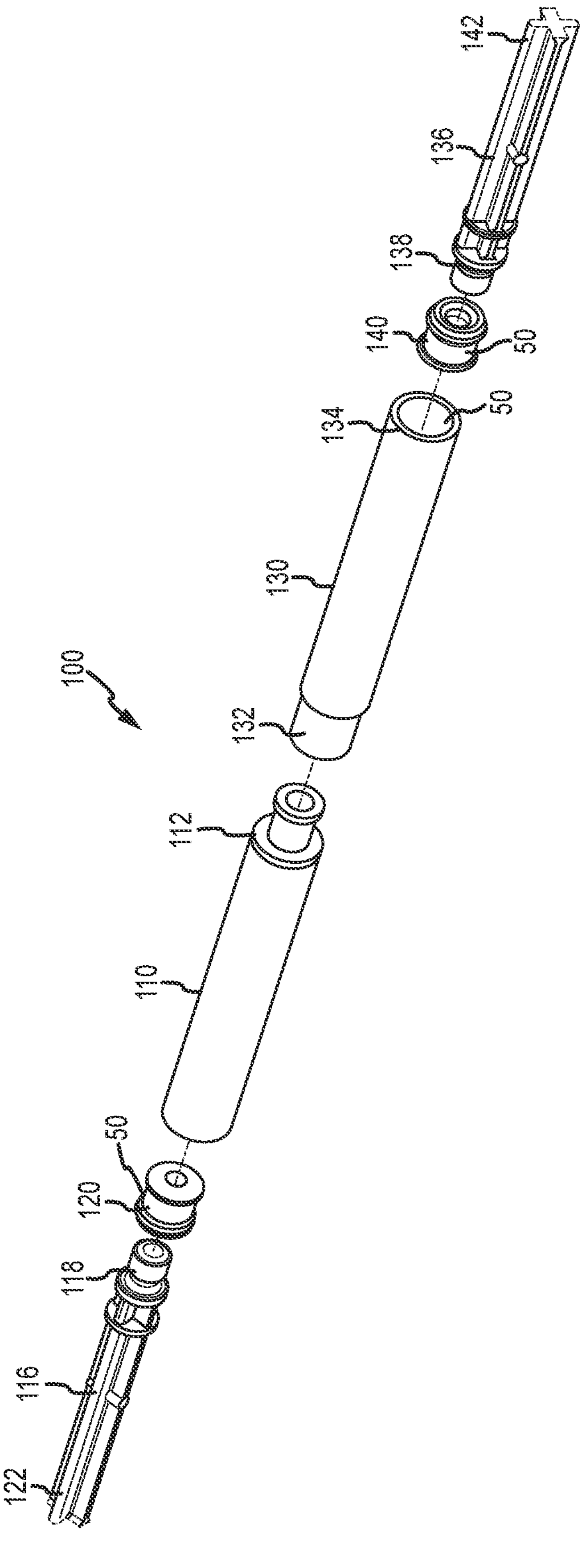
FIG. 2 is an exploded perspective view of the first embodiment shown in FIG. 1.
Figure 3:
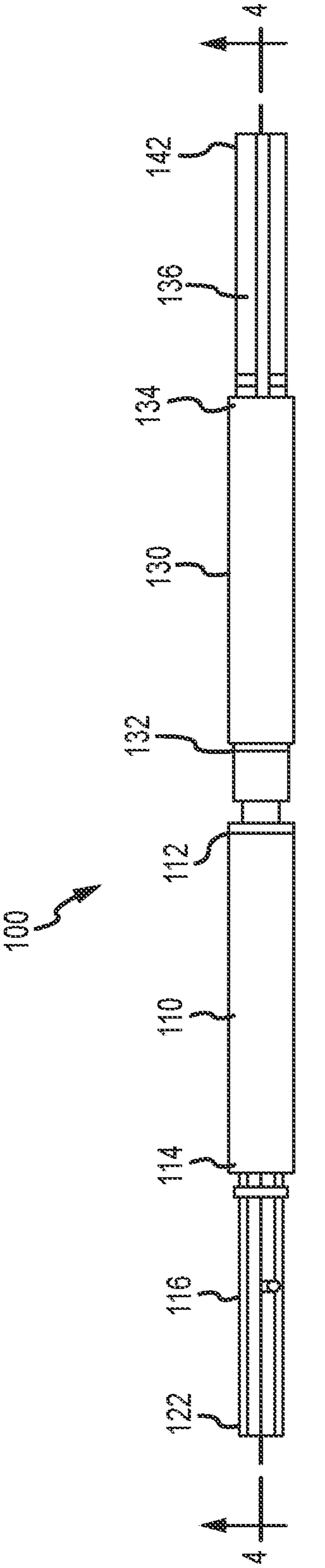
FIG. 3 is a side elevation view of the first embodiment shown in FIG. 1.
Figure 4:
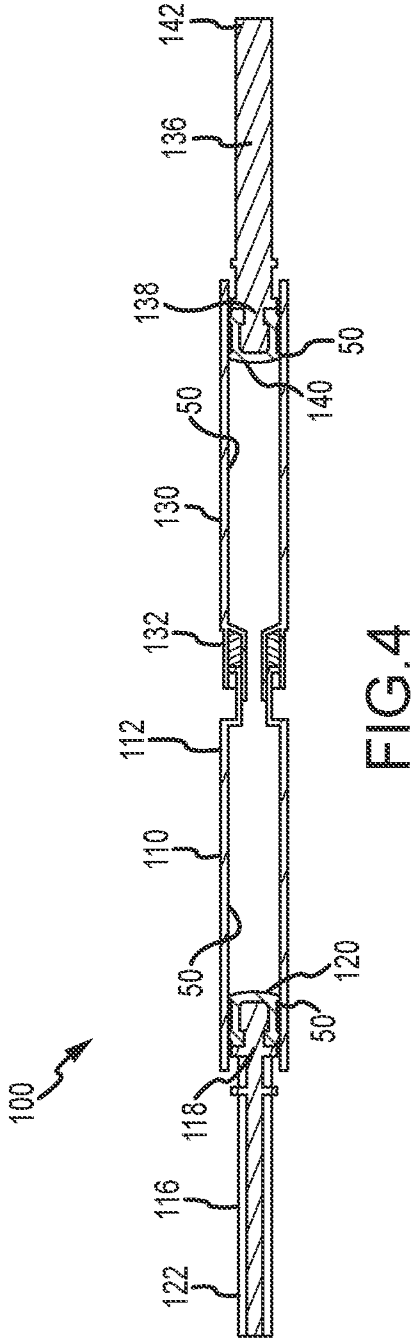
FIG. 4 is a cross-sectional view of the first embodiment shown in FIG. 1 along line 4-4.
Figure 5:
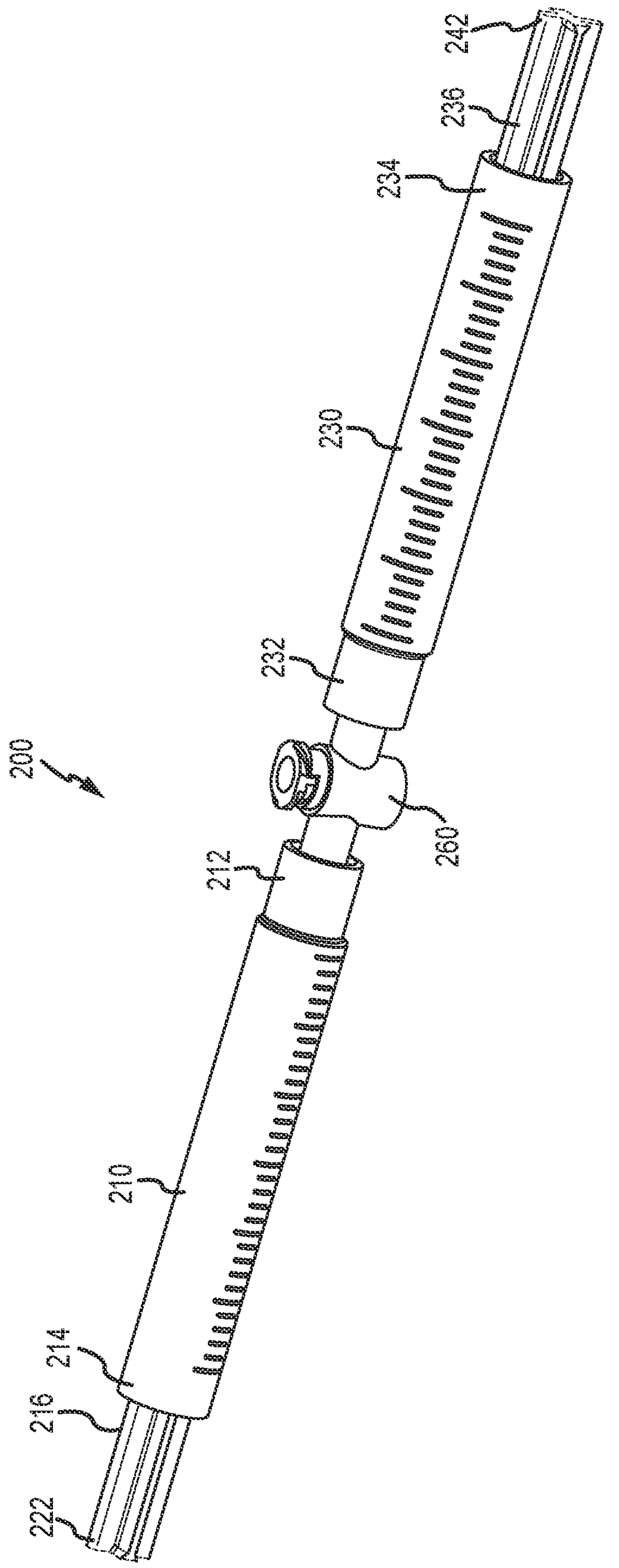
FIG. 5 is a perspective view of a second embodiment of a plastic actuator according to the present invention.
Figure 6:
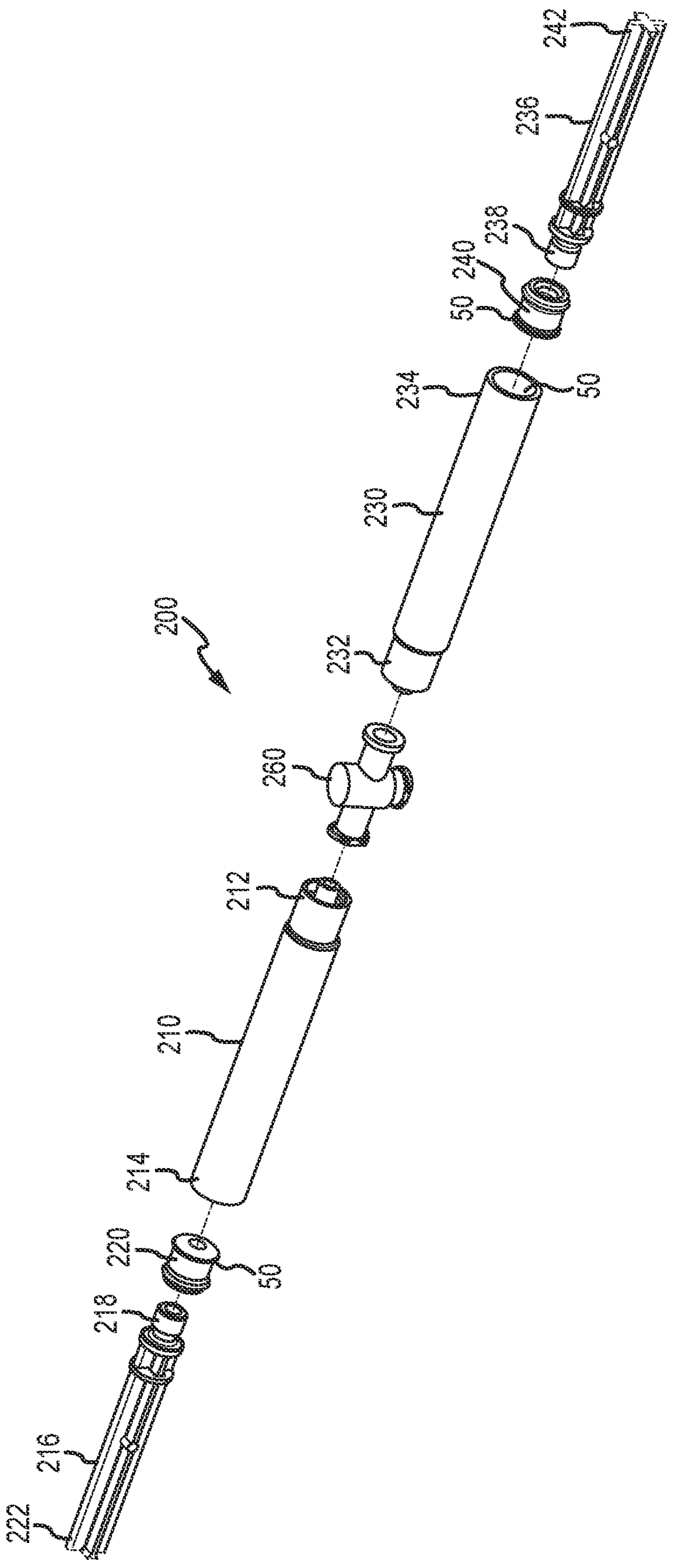
FIG. 6 is an exploded perspective view of the second embodiment shown in FIG. 5.
Figure 7:
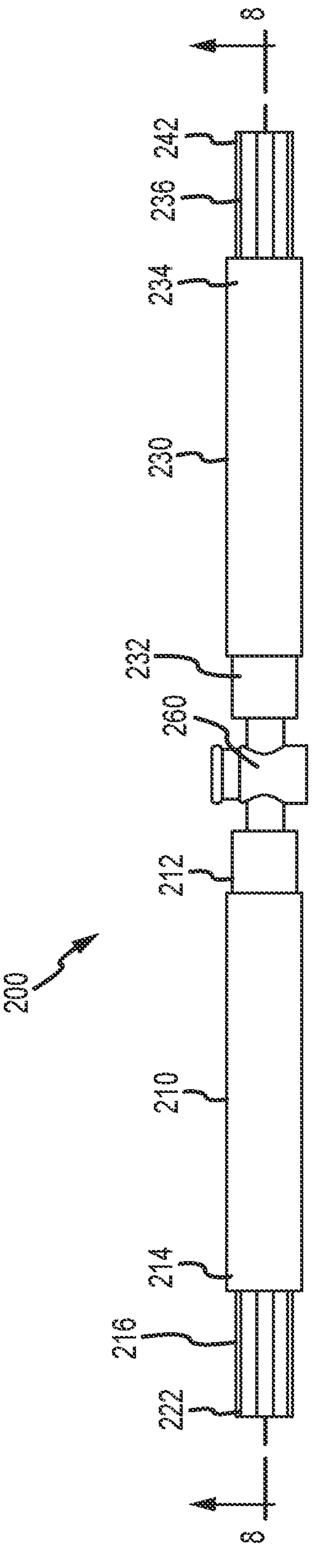
FIG. 7 is a side elevation view of the second embodiment shown in FIG. 5.
Figure 8:
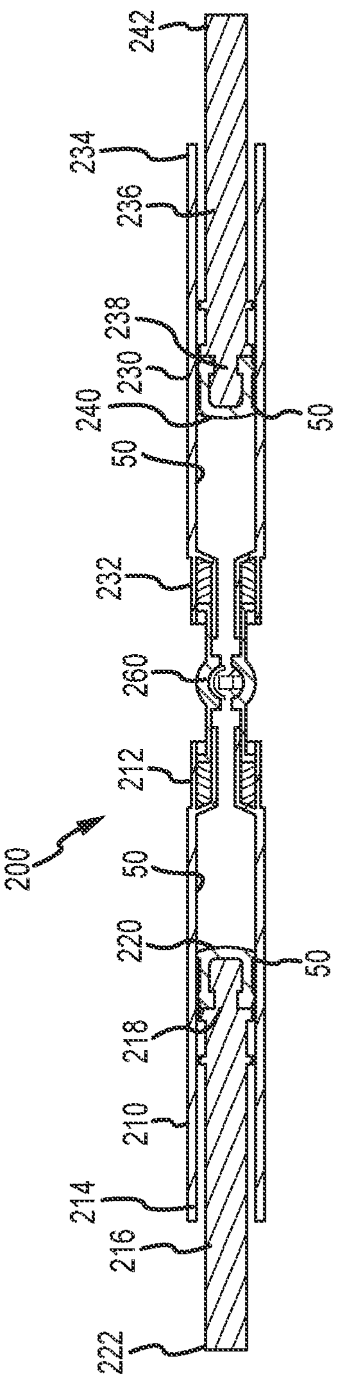
FIG. 8 is a cross-sectional view of the second embodiment shown in FIG. 5*a* long line 8-8.

The first plunger 116 preferably comprises a first end portion 118 and a second end portion 122. The first end portion 118 preferably comprises a first piston 120. As shown in FIG. 2, the first piston 120 is a separate element attached to the first end portion 118 of the first plunger 116; however, it is contemplated that the first piston 120 and the first plunger 116 may be a unitary piece. The first piston 120 is preferably sized and configured to translate back and forth within the first cylinder 110 and prohibit blow-by when exposed to predetermined pressures. The second end portion 122 of the first plunger 116 is preferably configured to facilitate the transfer of at least one of an input force and an output force.

The second cylinder 130 preferably comprises the first end portion 132 and a second end portion 134. The second end portion 134 is configured to receive the second plunger 136 therein and therethrough.

The second plunger 136 preferably comprises a first end portion 138 and a second end portion 142. The first end portion 138 preferably has a second piston 140. As shown in FIG. 2, the second piston 140 is a separate element attached to the first end portion 138 of the second plunger 136; however, it is contemplated that the second piston 140 and the second plunger 136 may be a unitary piece. The second piston 140 is preferably sized and configured to translate back and forth within the second cylinder 130 and prohibit blow-by when exposed to predetermined pressures. The second end portion 142 is preferably configured to facilitate the transfer of at least one of an input force and an output force.

The first and second cylinders 110,130 and the pump cylinder 12 preferably comprise cyclic olefin copolymer (COC) or cyclo-olefin polymer (COP). These polymers have similar barrier properties to glass but are not as fragile. COC and COP provide more resistance to the effects of organic solvents and provide superior optical clarity than glass. Forming the first and second cylinders 110,130 and the pump cylinder 12 from COC and COP also promotes mass production via injection molding and allow for tighter tolerances to be achieved than is possible with glass. It is contemplated, however, that other polymers may be used provided they have comparable properties.

Preferably a fluoropolymer coating 50 is applied as a dry lubrication within the first and second cylinders 110,130 and within the pump cylinder 12 (see FIG. 10). The fluoropolymer coating 50 promotes a reduction in the static friction between the first and second plungers 116,136 and the first and second cylinders 110,130, respectively, and the pump cylinder 12 to less than or equal to about 2.5 Newtons for a 1 cc cylinder and less than or equal to about 4.0 Newtons for a 3 cc cylinder.

The first and second pistons 120,140 preferably comprise thermoplastic elastomer (TPE). However, it is contemplated that other polymers may be used provided they have comparable properties. Similar to the first and second cylinders 110,130 and the pump cylinder 12, the fluoropolymer coating 50 is preferably applied as a dry lubrication to the first and second pistons 120,140. The fluoropolymer coating 50 is preferably applied in a tumbler, whereby the duration of tumbling is directly proportional to the thickness of the coating.

As a non-limiting example, one proposed use for the reciprocating actuator assembly 100 is for mixing a dry medicine (not shown) with a liquid (not shown) to provide a mixture (not shown) to be administered to a patient (not shown). For example, the dry medicine is provided in the first cylinder 110 and a liquid to be mixed with the dry medicine is provided in the second cylinder 130. The second plunger 136 is moved in the direction of the first cylinder 110 thereby injecting the liquid of the second cylinder 130 into the first cylinder 110. The first plunger 116 is moved in the direction of the second cylinder 130 and the mixture of dry medicine and liquid is injected into the second cylinder 130. This process is repeated until the mixture is adequately mixed. The first and second cylinders 110,130 may then be separated and the cylinder containing the mixture may be used to administer the mixture to the patient.

A second embodiment 200 of a reciprocating actuator assembly is shown in FIGS. 5-8. The reciprocating actuator assembly 200 comprises many elements similar to those provided in the first embodiment 100 including a first cylinder 210; a first plunger 216 with a first piston 220; a second cylinder 230 opposite the first cylinder 210; and a second plunger 236 with a second piston 240. The reciprocating actuator assembly 200 preferably comprises a check valve 260 joining the first cylinder 210 and the second cylinder 230, wherein the check valve 260 is configured to provide fluid communication between the first and second cylinders 210,230 and possibly a third device, for example a third cylinder with a third plunger (not shown). The reciprocating actuator assembly 200 is also preferably configured to be operably connected to the pump 10 shown in FIGS. 9 and 10.

Also, similar to the first embodiment 100, the first and second cylinders 210,230 and the pump cylinder 12 preferably comprise cyclic olefin copolymer (COC) or cyclo-olefin polymer (COP); however, it is contemplated that other polymers may be used provided they have comparable properties.

Like the first embodiment 100 described above, a fluoropolymer coating 50 is preferably applied as a dry lubrication within the first and second cylinders 210,230 and within the pump cylinder 12. The fluoropolymer coating 50 promotes a reduction in the static friction between the first and second plungers 216,236 and the first and second cylinders 210,230, respectively, and the pump cylinder 12 to less than about 2.5 Newtons for a 1 cc cylinder and less than about 4.0 Newtons for a 3 cc cylinder.

The first and second pistons 220,240 preferably comprise thermoplastic elastomer (TPE). However, it is contemplated that the other polymers may be used provided they have comparable properties. The fluoropolymer coating 50 is preferably applied as a dry lubrication to the first and second pistons 220,240. The fluoropolymer coating 50 is preferably applied in a tumbler, whereby the duration of tumbling is directly proportional to the thickness of the coating.

The reciprocating actuator system 200 may be used in a similar manner as that of the first embodiment 100, that is to facilitate the mixing of substances (not shown) to form a mixture (not shown). The reciprocating actuator system 200 is further configured to output the mixture and/or input an additional substance (not shown) through the check valve 260.

As provided above, the reciprocating actuator systems 100,200 are preferably configured to be operably connected to the pump 10 (see FIGS. 9 and 10). The pump 10 has a pump cylinder 12, a pump inlet 14 preferably with a check valve 16, and a pump outlet 18 preferably with a check valve 20, whereby the pump inlet 14 and pump outlet 18 facilitate movement of a substance (not shown) into and out of the pump cylinder 12, respectively. As shown in FIG. 10, the fluoropolymer coating 50 is provided on the inside surface of the pump cylinder 12.

In FIGS. 9 and 10 the first plunger 216 of the reciprocating actuator assembly 200 is shown received within the pump cylinder 12. The first plunger 216 further comprises a second piston 224 and is configured to translate back-and-forth within the pump cylinder 12 in directions A1 and B1. When the first plunger 216 moves in direction A1, the substance (not shown) is drawn into the pump cylinder 12 through the inlet 14, whereby the check valve 16 only allows the substance to flow in a flow direction A2. When the first plunger 216 moves in direction B1, the substance is pushed out of the pump cylinder 12 through the outlet 18, whereby the check valve 20 only allows the substance to flow in a flow direction B2.

It is further contemplated that a check-valve (not shown) be provided either within the pump 10 or outside of the pump 10 and configured to promote substance flow in only flow direction A2 when the first plunger 216 moves in direction A1 and only in flow direction B2 when the first plunger 216 moves in direction B1.

Although the pump 10 provides a reference of use for the reciprocating actuator systems 100,200, it should not be viewed as limiting the capability of the reciprocating actuator systems 100,200 nor the pump 10 to these configurations.

The foregoing is illustrative only of the principles of embodiments according to the present invention. Modifications and changes will readily occur to those skilled in the art, so it is not desired to limit the invention to the exact disclosure herein provided. While the preferred embodiment has been described, the details may be changed without departing from the invention, which is defined by the claims.

We claim:

1. A method for mixing, the method comprising the steps of:

providing a first plunger with a first piston in a first cylinder containing a first substance;

providing a second plunger with a second piston in a second cylinder containing a second substance;

whereby the first cylinder is in fluid communication with the second cylinder;

transferring the second substance from the second cylinder to the first cylinder through movement of the first plunger, whereby the second substance mixes with the first substance and forms a mixture; and transferring the mixture from the first cylinder to the second cylinder through movement of the second plunger;

whereby the first cylinder, the first piston, the second cylinder, and the second piston have a fluoropolymer coating.

2. The method of claim 1, wherein the first substance is a dry medicine and the second substance is a liquid.

3. The method of claim 1, wherein the first and second cylinders comprise cyclic olefin copolymer (COC).

4. The method of claim 1, wherein the first and second cylinders comprise cyclo-olefin polymer (COP).

5. The method of claim 1, wherein the first cylinder has approximately a 1 cc capacity and whereby the static friction between the first cylinder and the first piston is less than about 2.5 N.

6. The method of claim 1, wherein the first cylinder has approximately a 3 cc capacity and whereby the static friction between the first cylinder and the first piston is less than about 4.0 N.

7. The method of claim 1, wherein the first plunger has a first end and a second end, and the first end of the plunger is received within the first cylinder and the second end of the plunger is received within a pump cylinder.

8. The method of claim 1 further comprising the steps of:

providing a check valve; and coupling the check valve between the first cylinder and the second cylinder.

9. The method of claim 8 further comprising the steps of:

providing a third cylinder with a third plunger; and coupling the third cylinder to the check valve.

* * * * *